(12) United States Patent
Yasuie et al.

(10) Patent No.: US 6,520,842 B2
(45) Date of Patent: Feb. 18, 2003

(54) METHOD OF FORMING TOOTH GROOVES

(75) Inventors: Shigenori Yasuie, Wako (JP); Takeshi Morioka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/943,024

(22) Filed: Aug. 31, 2001

(65) Prior Publication Data

US 2002/0034926 A1 Mar. 21, 2002

(30) Foreign Application Priority Data

Sep. 4, 2000 (JP) ........................................ 2000-271517

(51) Int. Cl.$^7$ ................................................ B24B 1/00
(52) U.S. Cl. ........................... 451/47; 451/53; 451/231; 451/233
(58) Field of Search ............................ 451/47, 48, 53, 451/58, 51, 178, 232, 233, 231, 258, 449, 450, 541, 547

(56) References Cited

U.S. PATENT DOCUMENTS

| | | |
|---|---|---|
| 3,640,030 A | 2/1972 | Clarke et al. |
| 5,800,103 A * | 9/1998 | Stadtfeld ................ 409/27 |

FOREIGN PATENT DOCUMENTS

| | | |
|---|---|---|
| EP | 0 483 561 A1 | 5/1992 |
| JP | 63016921 | 1/1988 |
| JP | 2000-52144 | 2/2000 |

OTHER PUBLICATIONS

European Search Report dated Nov. 23, 2001.

* cited by examiner

*Primary Examiner*—Eileen P. Morgan
(74) *Attorney, Agent, or Firm*—Arent Fox Kintner Plotkin & Kahn, PLLC

(57) ABSTRACT

A cup-shaped grindstone for grinding an end face of an annular portion of a work to form tooth grooves in the end face includes a grinding portion provided around an outer periphery of a disk portion. Abrasive grains of CBN are electrodeposited on each of first, second and third grinding faces of the grinding portion. Cooling-liquid ejecting bores are provided in a lower end of the first grinding face. To form the tooth grooves, the following steps are carried out: a rough-finish processing step cuts the tooth grooves by intermittently feeding the cup-shaped grindstone in a predetermined amount at a time, and a finish processing step of finishing the tooth grooves by retaining the cup-shaped grindstone at a predetermined position after the rough-finish processing step. During both steps, a cooling liquid is supplied from cooling-liquid ejecting bores defined in the first grinding faces of the cup-shaped grindstone.

7 Claims, 11 Drawing Sheets

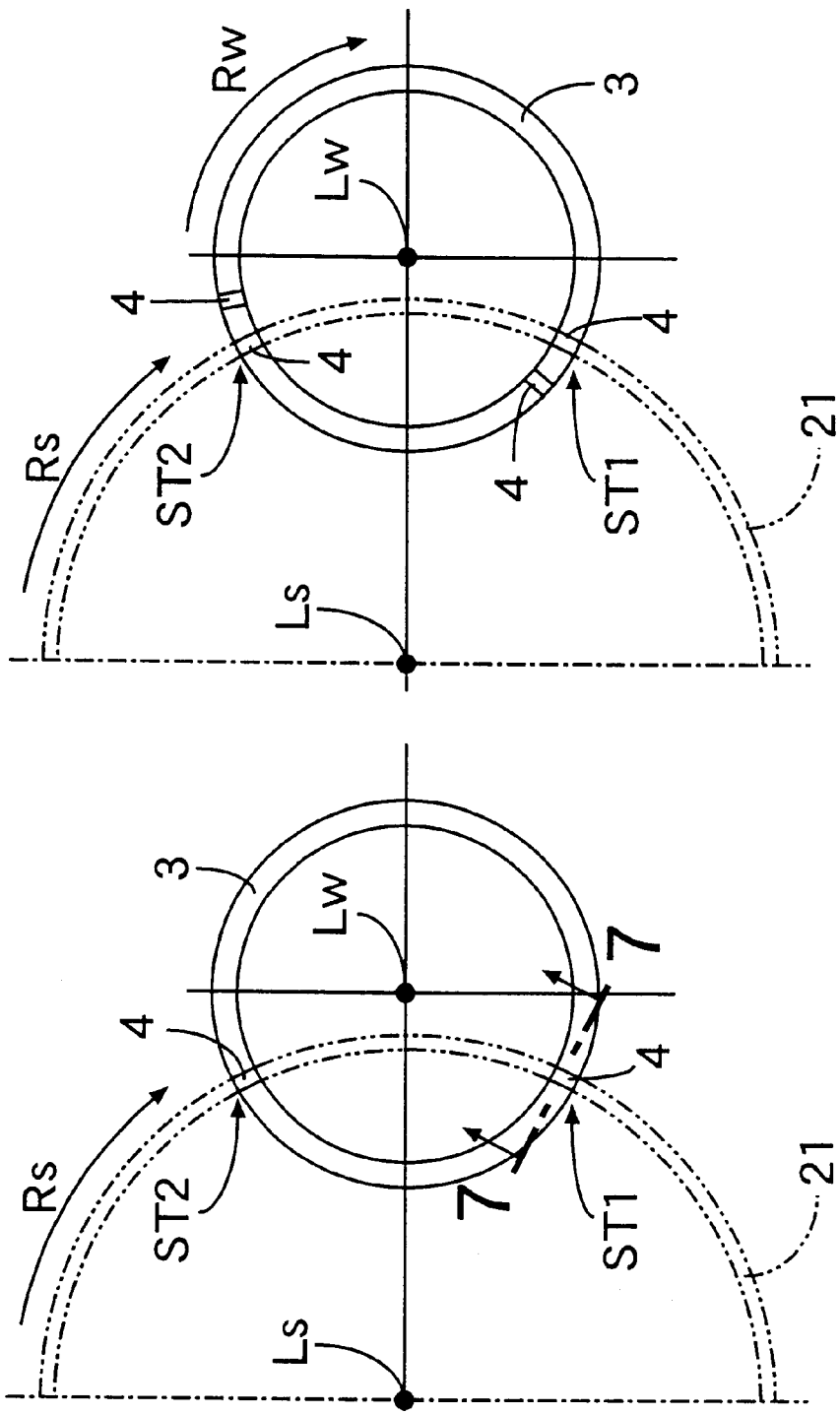

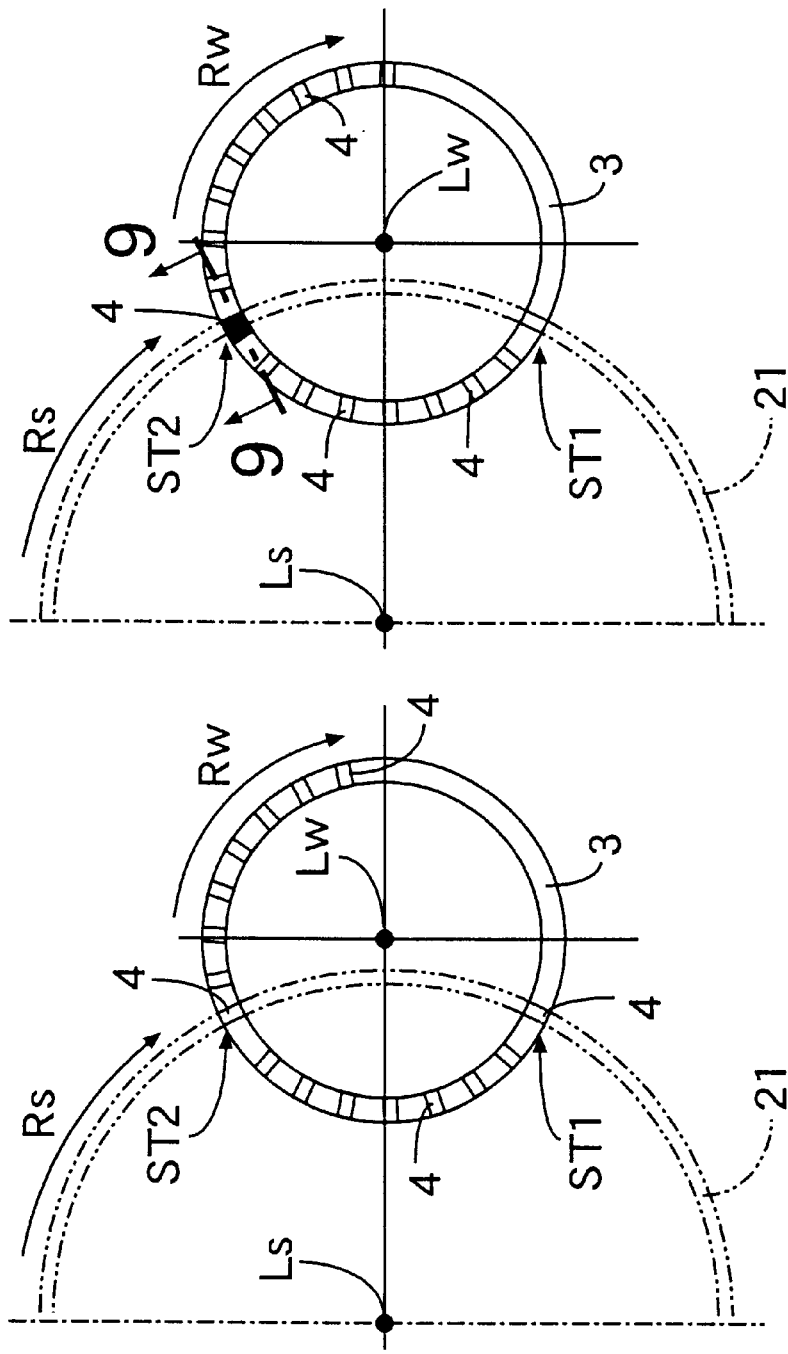

TOOTH RIDGE 5 (CONCAVE)

TOOTH GROOVE 4 (CONVEX)

TOOTH RIDGE 5 (CONVEX)

TOOTH GROOVE 4 (CONCAVE)

METHOD OF FORMING TOOTH GROOVES

BACKGROUND OF THE INVENTION

The present invention relates to a method for simultaneously forming radially extending tooth grooves at two points in an end face of an annular portion of a work by grinding using a cup-shaped grindstone having an axis offset from an axis of the work, while indexing the annular portion through a predetermined angle at a time by an indexing board.

RELATED ART

A method and apparatus for producing a CURVIC Coupling™ are known from Japanese Patent Application Laid-open No. 2000-52144. The CURVIC Coupling™ includes a first member having radial tooth grooves defined in an end face of an annular portion. A second member has radial tooth grooves defined in an end face of the annular portion, so that both of the first and second members are coaxially coupled by the tooth grooves of the former and the tooth grooves of the latter with each other. In this case, convex tooth ridges 5 and concave tooth grooves 4 of the second member (see FIG. 15B) are tightly engaged with the convex tooth grooves 4 and the concave tooth ridges 5 of the first member (see FIG. 15A) to illustrate a self-alignment function.

To form the tooth grooves for the Curvic Coupling™, a cup-shaped face mill is used. An axis of the cup-shaped face mill is parallel to and offset from an axis of an annular portion of a work (a first member or a second member). The end face of the annular portion is simultaneously ground at two points by cutting by the cup-shaped face mill while indexing the work through a predetermined angle. Finally, a large number of tooth grooves are roughly finished at predetermined distances in the entire periphery of the annular portion. Then, the cup-shaped face mill is replaced by a cup-shaped grindstone of CBN, and the above-described step is repeated to finish the roughly finished tooth grooves by the cup-shaped grindstone of CBN.

The conventionally known apparatus suffers from the necessity of having to replace the cup-shaped face mill with the cup-shaped grindstone of CBN, thereby resulting in an extended manufacturing time.

Another drawback is the necessity of having to supply a cooling liquid to cool the grinding faces of the cup-shaped face mill and the cup-shaped grindstone of CBN from the outside. Accordingly, the cooling liquid is unable to adequately reach the grinding faces, resulting in a reduced durability of each of the cup-shaped face mill and the cup-shaped grindstone of CBN.

SUMMARY OF THE INVENTION

It is an object of the present invention to overcome the above-described drawbacks of the related art.

It is another object of the present invention to ensure that to form tooth grooves in an end face of an annular face of a work by grinding, the tooth grooves can be made by the grinding without replacement of a tool, and the cooling of the tool can be promoted, leading to an enhanced durability of the tool.

It is yet another object of the present invention to provide a method for forming tooth grooves, which includes supporting a work having an annular portion, so that its axis is aligned with an axis of an indexing board, and radially extending tooth grooves are simultaneously formed in an end face of the annular portion at two points in a grinding manner using a cup-shaped grindstone having an axis offset from the axis of the work, while indexing the annular portion through a predetermined angle at a time by the indexing board. The method includes a rough-finish processing step that cuts the tooth grooves by intermittently feeding the cup-shaped grindstone in a predetermined amount at a time. A finish processing step finishes of the tooth grooves by retaining the cup-shaped grindstone at a predetermined position after the rough-finish processing step, while supplying a cooling liquid from cooling-liquid ejecting bores defined in at least one of grinding faces of the cup-shaped grindstone during each of the steps.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIGS. 4A and 4B are diagrams showing a first portion of a processing step for tooth grooves;

FIGS. 5A and 5B are diagrams showing a second portion of the processing step for the tooth grooves;

DETAILED DESCRIPTION OF PREFERRED EMBODIMENTS

The mode for carrying out the present invention will now be described by way of embodiments of the present invention shown in the accompanying drawings.

FIGS. 1–10 illustrate a preferred embodiment of the present invention.

Figure 2:
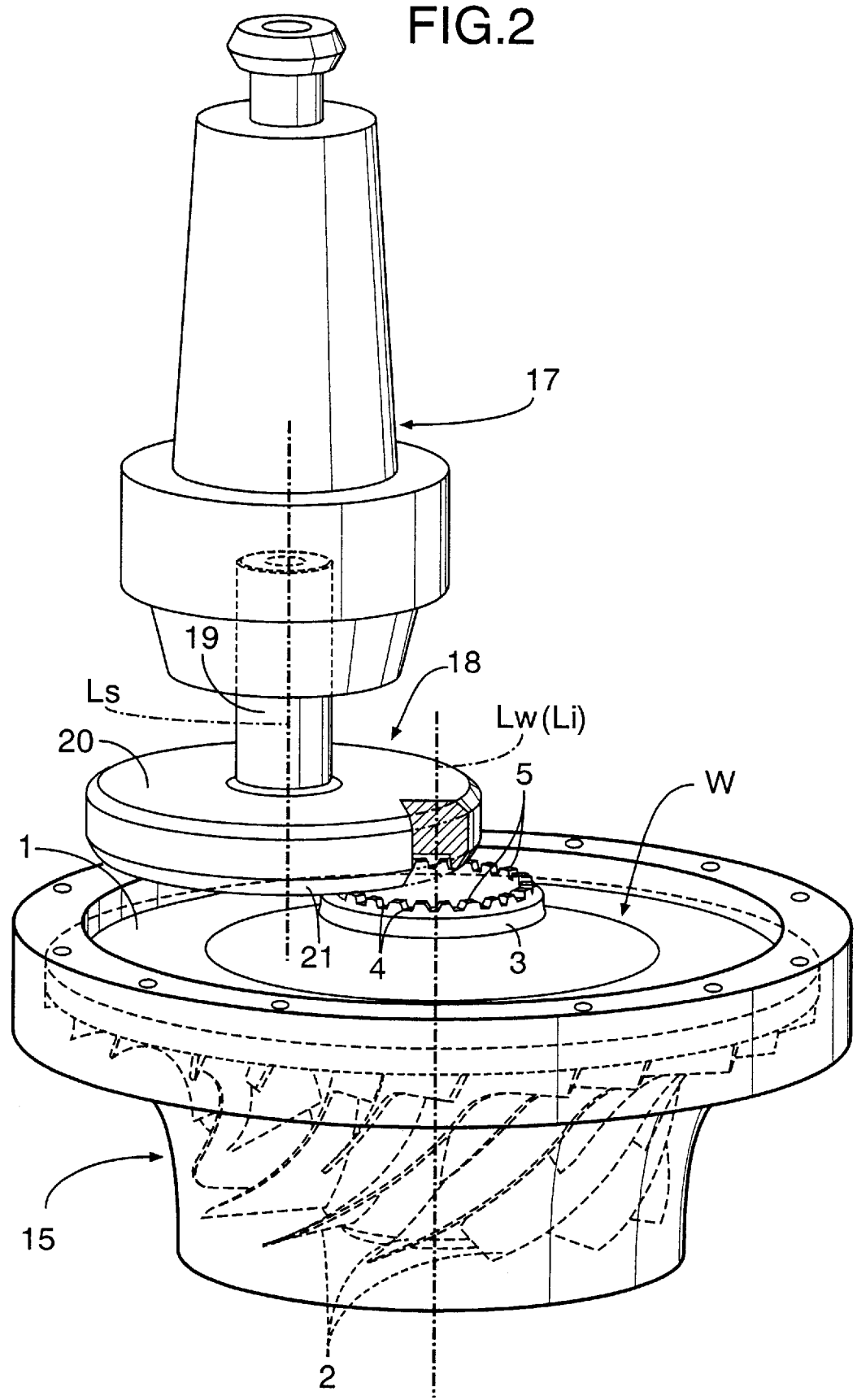
FIG. 2 is an enlarged view of an essential portion shown in FIG. 1.
Figure 15A:
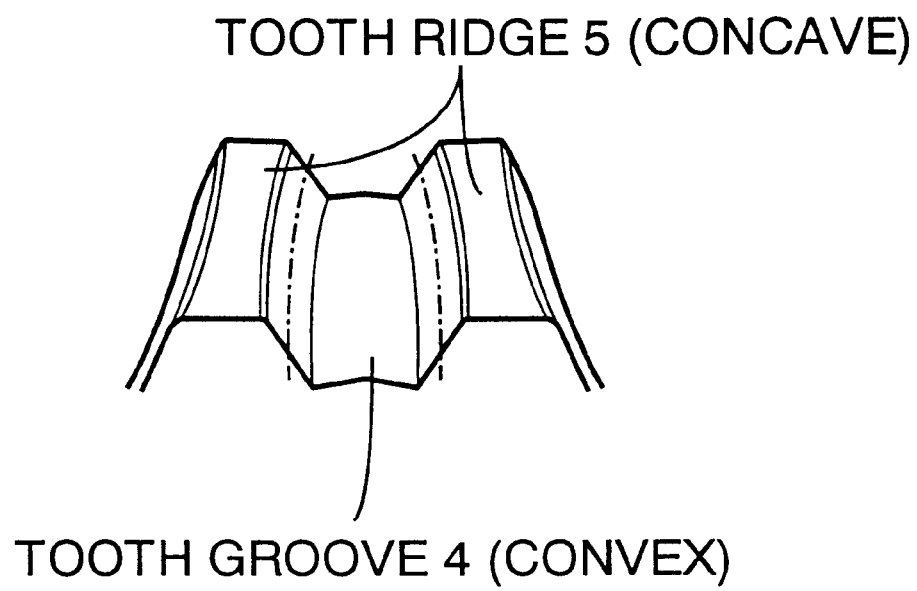
FIG. 15 is a perspective view showing shapes of tooth grooves and tooth ridges in a coupling device.
Figure 15B:
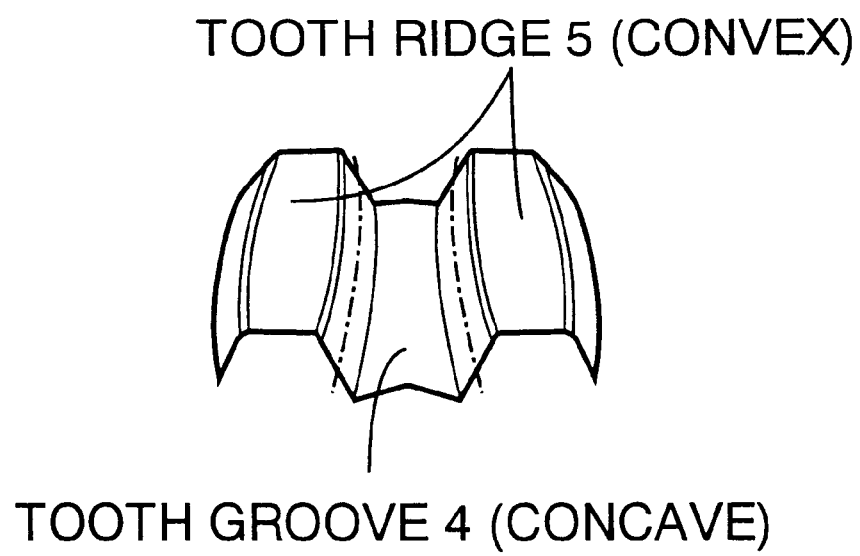

As shown in FIG. 2, a work W used in the preferred embodiment is a centrifugal compressor wheel. The work W has a large number of compressor blades 2 formed on a side of a circular disk 1. An annular portion 3 provided around an axis Lw of the work W is formed on the other side of the disk 1. A plurality of tooth grooves 4 are formed in an end face of the annular portion 3. The tooth grooves 4 to extend radially in a direction away from the work axis Lw with tooth ridges 5 positioned between adjacent tooth grooves 4. It should be noted that the 24 tooth grooves 4 are illustrated in this embodiment merely for exemplary purposes only and that it is within the scope of this invention to have a suitable number of tooth grooves 4 sufficient to perform the desired function. As shown in FIG. 15A, when the shape of each tooth groove 4 is convex, the shape of each tooth ridge 5 is concave. As shown in FIG. 15B, when the shape of each tooth groove 4 is concave, the shape of each tooth ridge 5 is convex.

The convex tooth grooves 4 mesh with the convex tooth ridges 5. Likewise, the concave tooth grooves 4 mesh with the concave tooth ridges 5. Therefore, the tooth profiles shown in FIGS. 15A and 15B cooperate to form a coupling. If the annular portion 3 of the work or compressor wheel W shown in FIG. 2 has the tooth profile shown in FIG. 15A, an annular portion of a shaft or a turbine wheel coupled to the annular portion 3 of the work W has the tooth profile shown in FIG. 15B. Likewise, if the annular portion 3 of the work or compressor wheel W has the tooth profile shown in FIG. 15B, an annular portion of the shaft or turbine wheel coupled to the annular portion 3 of the work W has the tooth profile shown in FIG. 15A.

Figure 1:
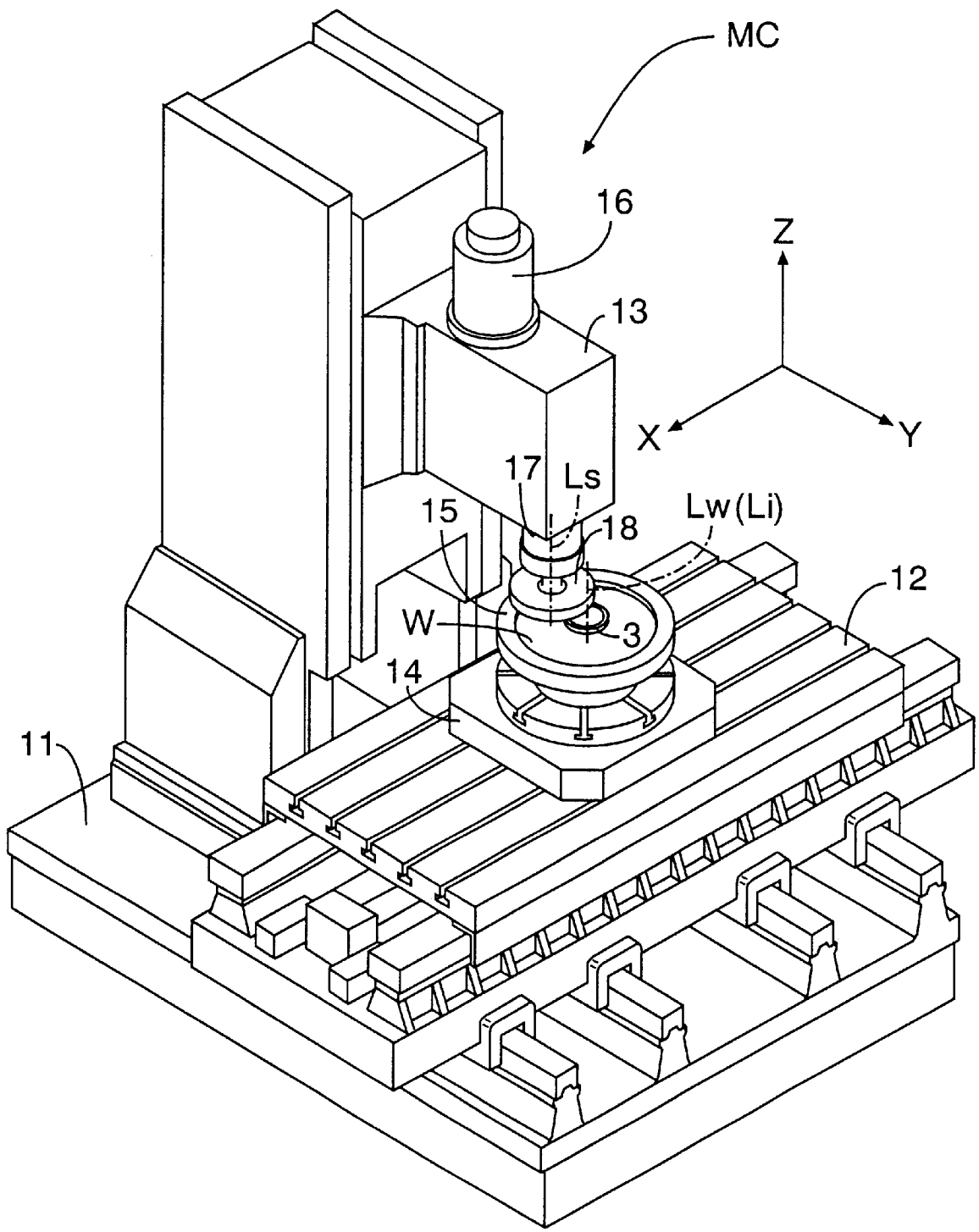
FIG. 1 is a perspective view of a machining center.

As shown in FIGS. 1–2, a general-purpose machining center MC that grinds the coupling includes a machine table 12 supported on a base table 11 and movable in directions corresponding to an X-axis, a Y-axis and a Z-axis, all of which are perpendicular relative to one another. A spindle head 13 is mounted on the base table to extend vertically therefrom. An indexing board 14 is fixed on the machine table 12. The circular disk 1 and compressor blades 2 of the work W are retained in a fitted manner on a jig 15 fixed to the indexing board 14. In this state, the annular portion 3 is exposed on an upper surface of the circular disk 1 of the work W. If an axis of the jig 15 is aligned with an axis Li of the indexing board 14 when the jig 15 is fixed thereto, the axis Lw of the work W, which also corresponds to an axis of the annular portion 3, can be automatically aligned with the axis Li of the indexing board 14.

The spindle head 13 is provided with a main spindle driven by a motor 16. A cup-shaped grindstone 18 is mounted on an axis Ls of the main spindle by a milling chuck 17. The cup-shaped grindstone 18 includes a shaft portion 19 chucked by the milling chuck 17, a disk portion 20 connected to a tip end of the shaft portion 19, and an annular grinding portion 21 that extends axially from an outer periphery of the disk portion 20.

Figure 3:
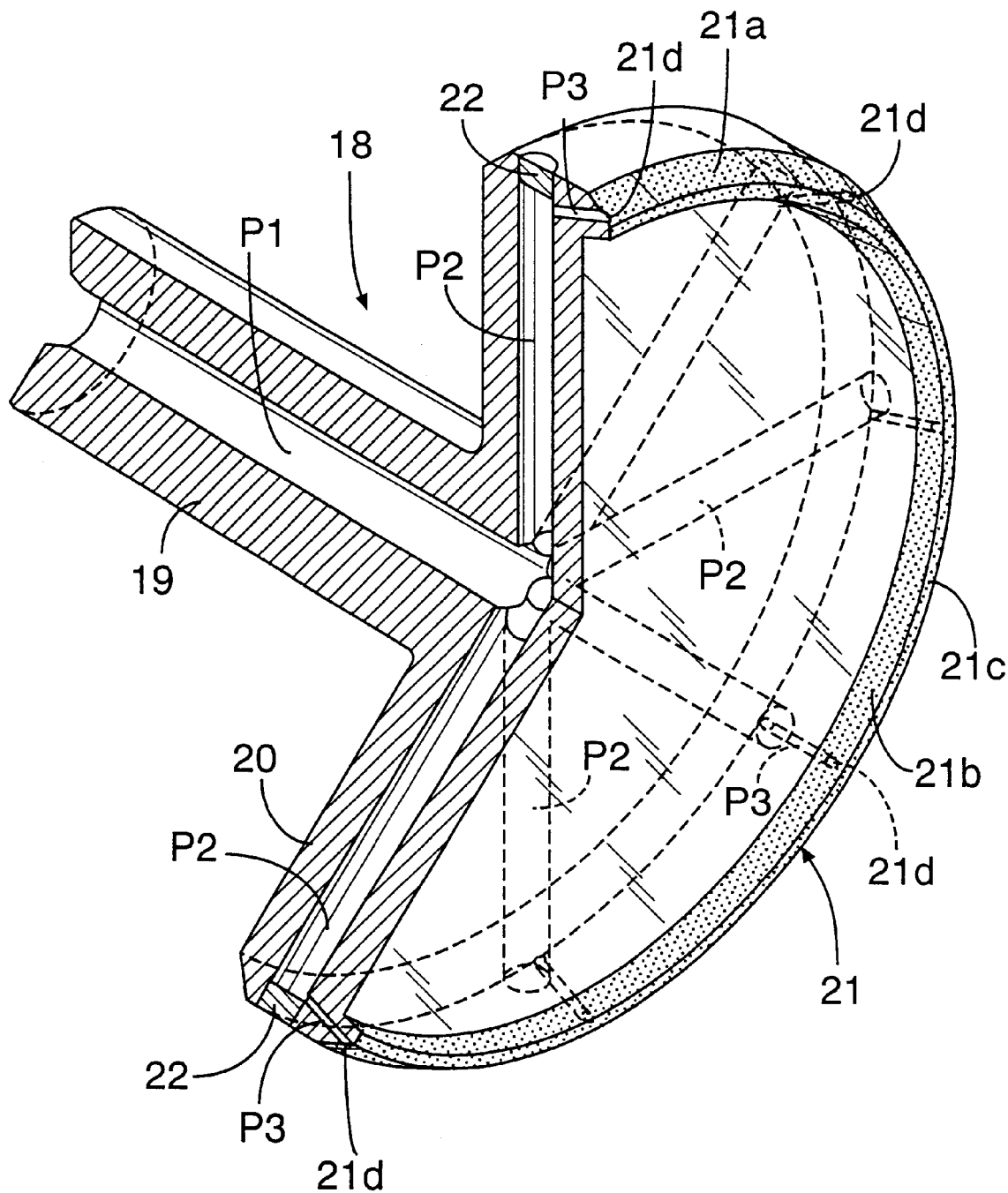
FIG. 3 is a partially broken perspective view of a cup-shaped grindstone.
Figure 7:
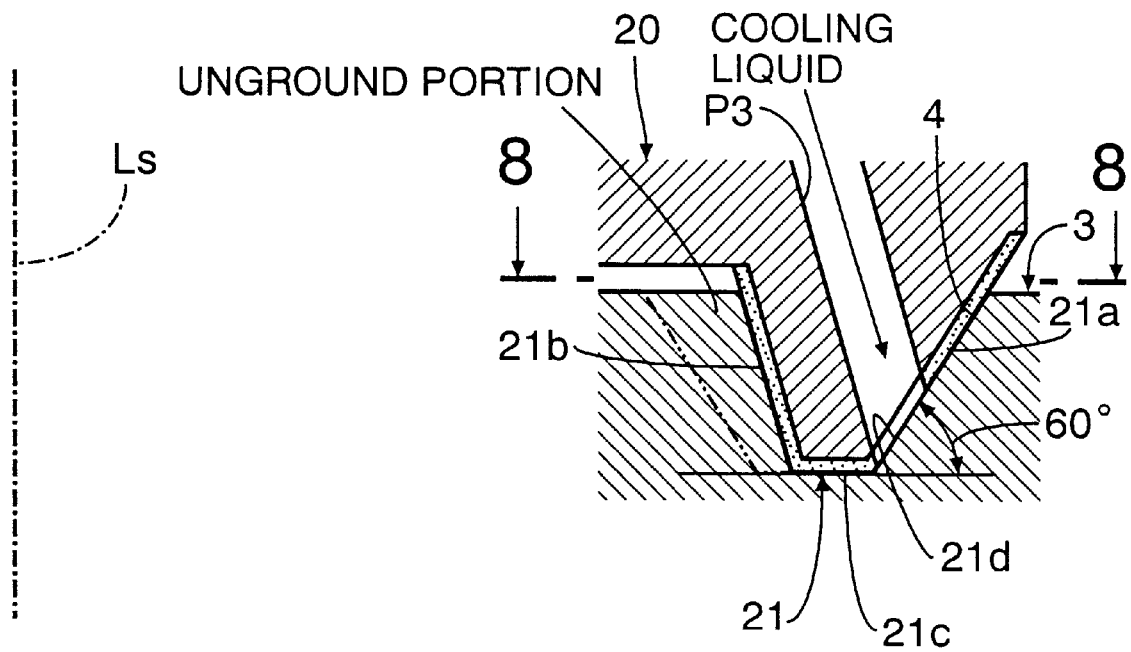
FIG. 7 is an enlarged sectional view taken along a line 7—7 in FIG. 4A.

FIGS. 3 and 7 show the cup-shaped grindstone 18 that forms the convex tooth grooves 4 shown in FIG. 15A by grinding. The grinding portion 21 of the cup-shaped grindstone 18 has a downward-tapered sectional shape. The grinding portion 21 includes a first grinding face 21a located radially outward with respect to the axis Ls of the grindstone 18, a second grinding face 21b located radially inward with respect to the axis Ls of the grindstone 18, and a third horizontal grinding face 21c that connects the first and second grinding faces 21a and 21b to each other.

The angle formed by the first grinding face 21a relative to a horizontal plane of the disk portion 20 is approximately 60°. The angle formed by the second grinding face 21b relative to the horizontal plane of the disk portion 20 is such that the cup-shaped grindstone 18 does not interfere with the tooth ridge 5 located next to another tooth ridge 5 being formed. The angle formed by the second grinding face 21b relative to the horizontal plane is larger than the angle formed by the first grinding face 21a relative to the horizontal plane in order to form the tooth ridges 5 shown in FIG. 15.

Abrasive grains of cubic boron nitride (CBN) having a hardness ranking next to that of diamond are electrodeposited on each of the first, second and third grinding faces 21a, 21b and 21c. The grain size of the abrasive grains is suitable in a range of about #50 to about #300. The surface of the cup-shaped grindstone 18 having the abrasive grains electrodeposited thereon is polished, whereby the shape accuracy of the grindstone is adjusted to 50 μm or less. As a result of the adjustment of the shape accuracy to 50 μm or less, not only is the roughness of the side faces of the tooth groove 4 enhanced, but when parts are fastened, the longitudinal positional relationship between the parts is consistent even if the parts are replaced, resulting in an enhanced interchangeability. The cup-shaped grindstone 18 having the high-hardness CBN electrodeposited thereon in the above manner is used to process various materials such as, for example only, a hardened steel having a high hardness, titanium, inconel, a nickel alloy, a cobalt alloy, an aluminum alloy, a general resinous part, ceramics and the like.

A first cooling-liquid passage P1 extends through the center of the shaft portion 19 of the cup-shaped grindstone 18. The first cooling-liquid passage P1 communicates at a lower end with a plurality (eight in the embodiment) of second cooling-liquid passages P2 that extend in a radial manner within the disk portion 20. Third cooling-liquid passages P3 extend within the grinding portion 21 from near the outer ends of the second cooling-liquid passages P2. The third cooling-liquid passages P3 are closed by blind plugs 22 and communicate with cooling-liquid ejecting bores 21d formed within the first grinding face 21a near the lower ends of the first grinding face 21a.

A method of forming the tooth profile where the tooth grooves 4 are convex and the tooth ridges 5 concave as shown in FIG. 15A will be described below with reference to FIGS. 4A–6B.

As shown in FIG. 4A, the axis Ls of the cup-shaped grindstone 18 and the axis Lw of the annular portion 3 of the work W are offset from each other by a predetermined amount. The grinding portion 21 of the cup-shaped grindstone 18 is opposite the annular portion 3 of the work W at a first processing station ST1 and a second processing station ST2 located approximately 120° apart from each other relative to the radially outer face of the annular portion 3. In this state, the cup-shaped grindstone 18 is lowered while rotating in a direction indicated by arrow Rs about the axis Ls. The grindstone 18 simultaneously grinds the two points of the annular portion 3 spaced 120° apart from each other in the first and second processing stations ST1 and ST2. In this case, during a first rough-finish processing step, the cup-shaped grindstone 18 forms the tooth grooves 4 while being fed stepwise.

The amount of each step can be changed as desired depending on the processing feed depth, but is preferable that the feed depth be in a range of about 0.01 to about 0.1 mm, if the life and processing accuracy of the cup-shaped grindstone 18 are taken into consideration. For example, if the feed depth during processing is 2 mm, the number of steps is 40 provided the amount of each step is 0.05 mm. More specifically, by operating the cup-shaped grindstone 18 in the following order of feeding, returning, feeding, returning, feeding, and returning, the work W is roughly finished stepwise to a position short of a target finishing face by a length in a range of 0.05 mm to 0.10 mm. At a subsequent finish processing step, the cup-shaped grindstone 18 is fed to the target finishing face and retained at such position for a predetermined time, such as, for example, 2 seconds to 10 seconds, to finish the processing and is then retracted upwards.

Figure 8:
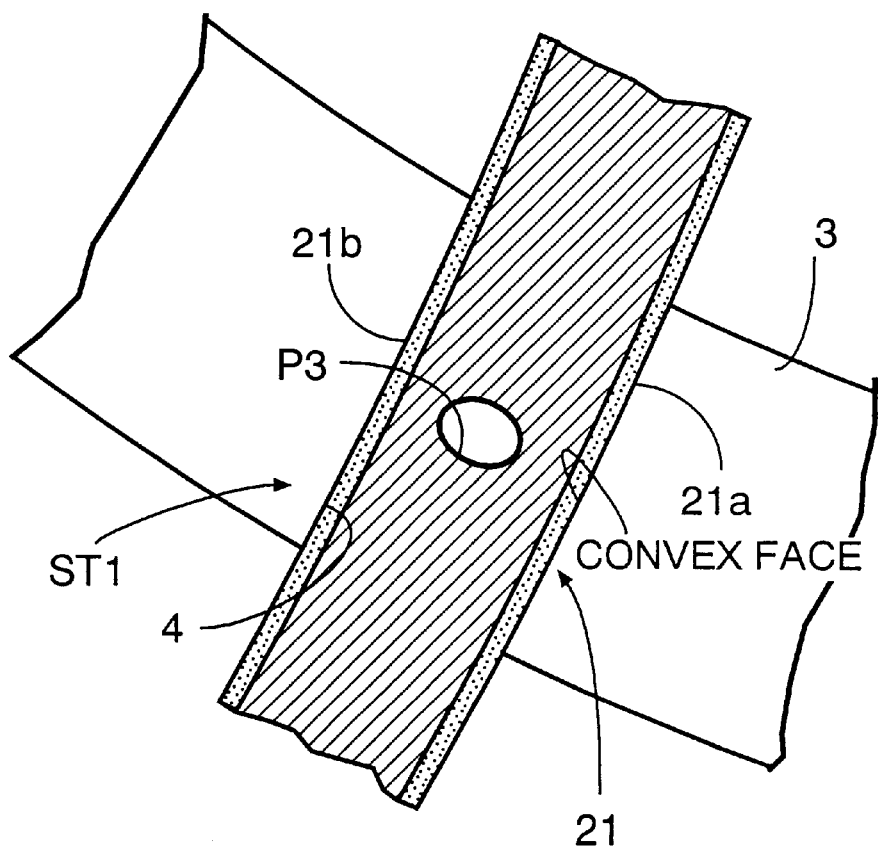
FIG. 8 is a sectional view taken along a line 8—8 in FIG. 7.

As a result, the two points of the annular portion 3 of the work W have been subjected to a primary processing. During the primary processing, only half of each of the tooth grooves is finished and the remaining half is left unprocessed. Specifically, as shown in FIG. 7, the work W is in a state in which the tooth grooves 4 have been completed in the portions ground by the radially outer first grinding face 21a and the horizontal third grinding face 21c. An unground portion, as shown by a dashed line, needing to be further ground, has been left radially inside the portion ground by the radially outer second grinding face 21b. A portion of each tooth groove 4 is formed by the grinding of the radially outer first grinding face 21a into a convex shape as shown in FIG. 8.

Subsequently, as shown in FIG. 4B, the annular portion 3 of the work W is indexed 15° by the indexing board 14 in a direction indicated by arrow Rw. The above-described operation is repeated, whereby two tooth grooves 4, 4 are newly formed by the primary processing at locations spaced respectively 15° apart from the two tooth grooves 4, 4 initially formed by the primary processing. A state of the work W resulting from repeating the operation 8 times is shown in FIG. 5A. In this state, (2×8=) 16 tooth grooves 4 are formed in the annular portion 3 by the primary processing.

Figure 9:
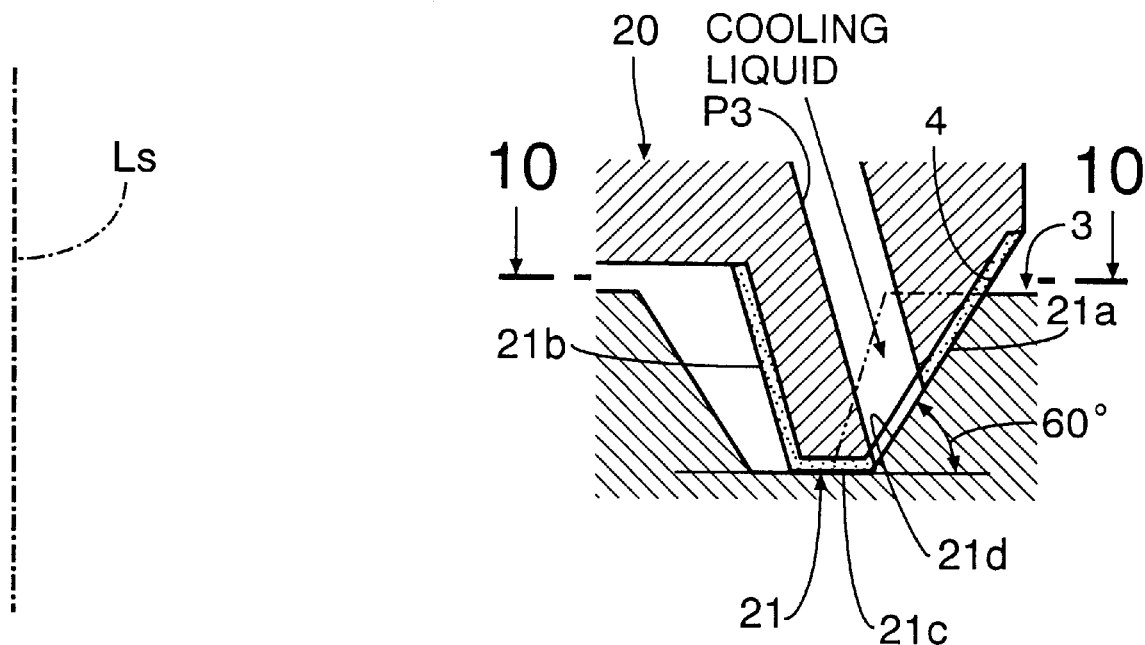
FIG. 9 is an enlarged sectional view taken along a line 9—9 in FIG. 5B.
Figure 10:
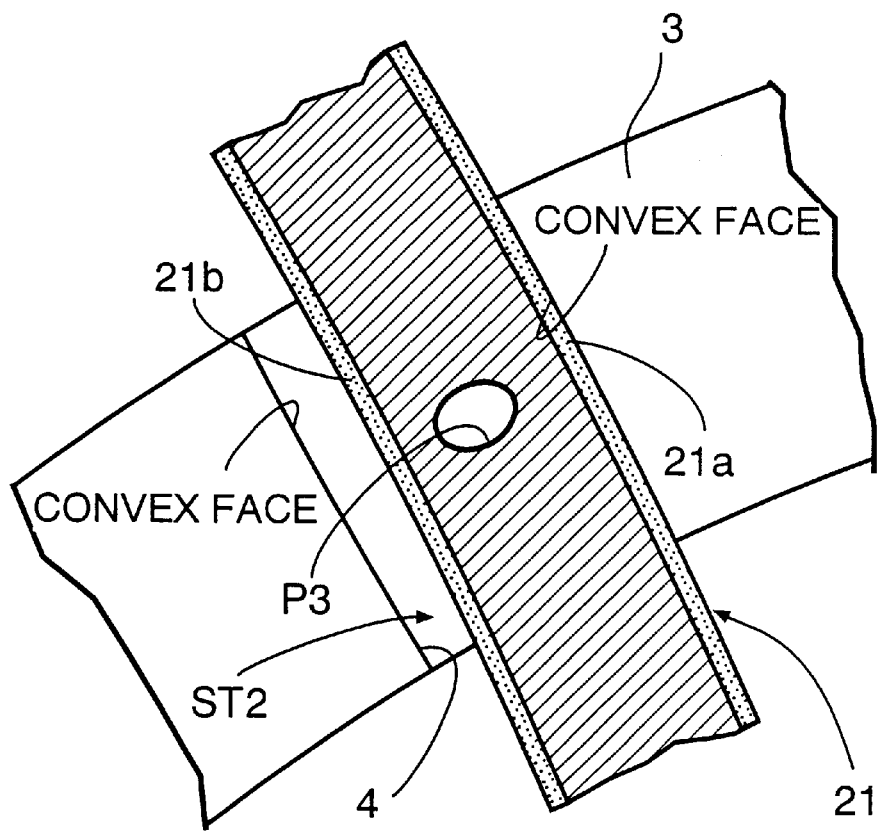
FIG. 10 is a sectional view taken along a line 10—10 in FIG. 9.

When the annular portion 3 of the work W is further indexed by the indexing board 14 another 15° in the direction of arrow Rw, as shown in FIG. 5B, the tooth grooves 4 initially formed by the primary processing in the first processing station ST1 in FIG. 4A reach the second processing station ST2, where they are subjected to a secondary processing. In the second station ST2, the unground portion, as shown by the dashed line, remaining from the primary process is subjected to the secondary processing carried out by the radially outer first grinding face 21a and the third grinding face 21c, wherein the tooth grooves 4 are completed, as shown in FIG. 9. During the secondary processing, the radially inner second grinding face 21b of the cup-shaped grindstone 18 does not participate in the grinding operation. During the secondary processing, the following steps are carried out: a rough-finish processing step at which the cup-shaped grindstone 18 is fed stepwise in a three-stage manner, and a finish processing step at which the cup-shaped grindstone 18 is fed to a target finishing position and retained for a predetermined time. In FIGS. 4A to 6B, the tooth grooves 4 shown in white are the uncompleted grooves from the primary processing, and the tooth grooves 4 shown in black are the completed grooves due to the secondary processing.

Figures 6A, 6B:
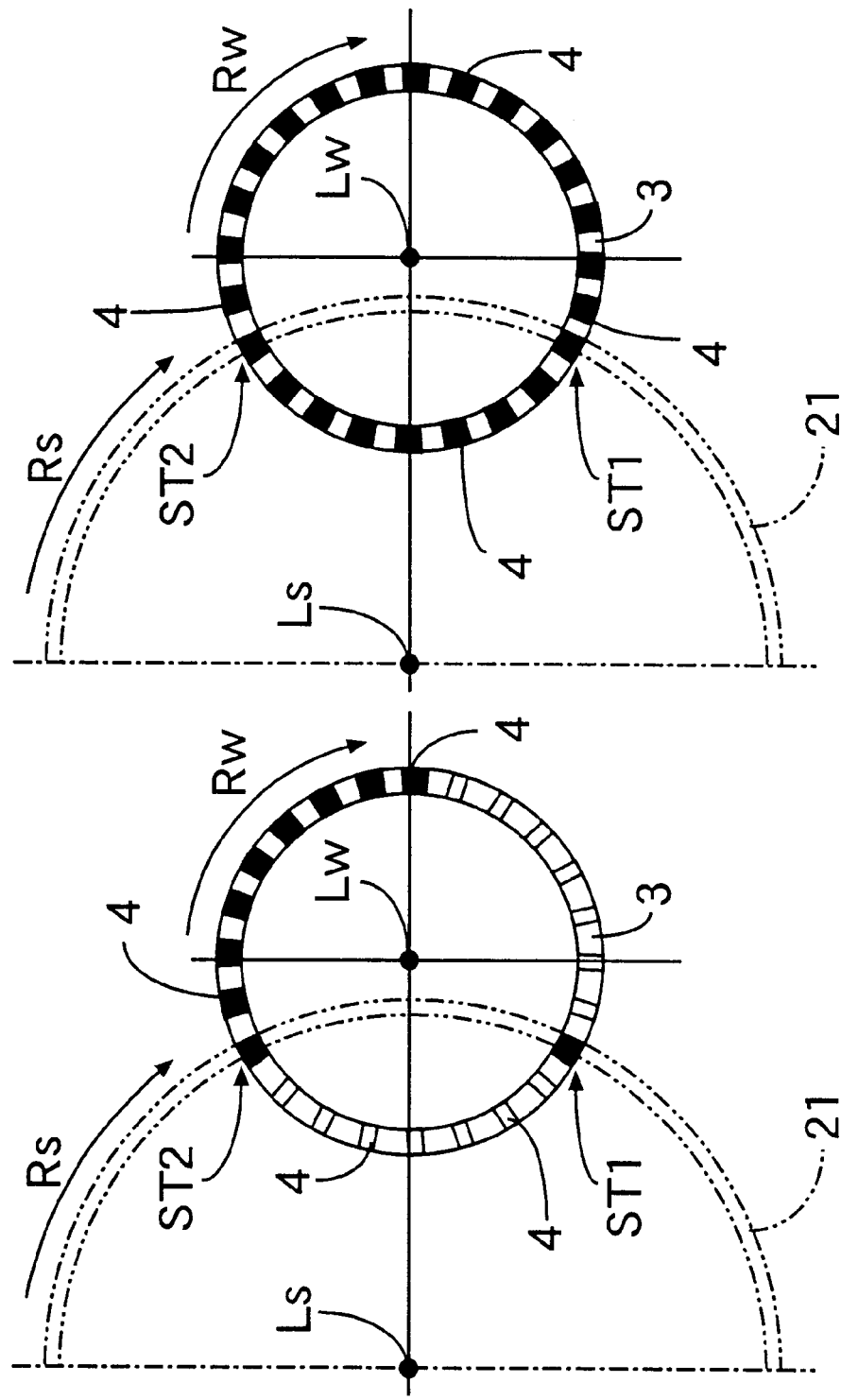
FIGS. 6A and 6B are diagrams showing a third portion of the processing step for the tooth grooves.

Then, the annular portion 3 of the work W is subjected to the secondary processing in the second processing station ST2, while being indexed in 15° increments or stages, wherein the tooth grooves 4 are completed one by one. During this time, the eight tooth grooves 4 formed by the primary processing in the second processing station ST2 immediately after the start of the processing are advanced to the first processing station ST1. When the eight tooth grooves 4 reach the first processing station ST1, they are subjected to the secondary processing, as shown in FIG. 6A. At a time when the last tooth groove 4 of the eight tooth grooves 4 has received the secondary processing in the first processing station ST1, all of the tooth grooves 4 are completed, thereby finishing the tooth-cutting method of one work W.

During the grinding by the cup-shaped grindstone 18, the reduction in durability of the cup-shaped grindstone 18 due to overheating and clogging of the first, second and third grinding faces 21a, 21b and 21c by a sludge produced during the grinding are prevented by cooling the first, second and third grinding faces 21a, 21b and 21c using a cooling liquid ejected from the cooling-liquid ejecting bores 21d via the first, second and third cooling-liquid passages P1, P2 and P3.

As shown in FIG. 7, the cooling-liquid ejecting bores 21d open in the vicinity of the lower end of the radially outer first grinding face 21a. Therefore, the ejected cooling liquid flows radially outward relative to the axis Ls of the grindstone 18 by a centrifugal force to cool the first grinding face 21a and to wash away the sludge, thereby enhancing the durability of the cup-shaped grindstone 18 and the finishing accuracy. At that time, the amount of the cooling liquid supplied to the second grinding face 21b and the third grinding face 21c is less than that supplied to the first grinding face 21a. However, this does not cause a hindrance because the face (see FIG. 7) finished by the second grinding face 21b in the primary processing is again ground and accurately finished by the first grinding face 21a in the secondary processing (see FIG. 9), and the accuracy of the bottoms of the tooth grooves 4 ground by the third grinding face 21c is not required so much as that of the side faces.

As described above, to form the tooth grooves 4 in the annular portion 3 of the work W by grinding using the cup-shaped grindstone 18, the cup-shaped grindstone 18 is fed in the stepwise manner to perform the rough-finish processing and then retained for the predetermined time to perform the finish processing. Therefore, it is possible to prevent the overheating and the clogging of the first, second and third grinding face 21a, 21b and 21c due to the sludge so as to enhance the finishing accuracy and the durability of the cup-shaped grindstone 18, as compared with the case where continuous grinding is performed. Moreover, it is not necessary to exchange a rough-finish processing grindstone and a finish processing grindstone with each other and hence, the processing time can be shortened. Particularly, the cooling liquid is supplied from the cooling-liquid ejecting bores 21d opening in the first grinding face 21a through the inside of the cup-shaped grindstone 18 rather than being supplied from the outside of the cup-shaped grindstone 18. Therefore, the cooling liquid can be effectively supplied to the first, second and third grinding faces 21a, 21b and 21c, thereby further effectively preventing the clogging and the overheating of the cup-shaped grindstone 18 to contribute to an enhancement in finishing accuracy and the durability of the cup-shaped grindstone 18.

A second embodiment of the present invention will now be described with reference to FIGS. 11 to 14. In the above-mentioned first embodiment, the grinding of the convex tooth grooves 4 shown in FIG. 15A has been explained, and in the second embodiment, the grinding of the concave tooth grooves 4 will be explained. The cup-shaped grindstone 18 in the first embodiment includes the first and second grinding faces 21a and 21b at radially outer and inner locations, respectively, to form the convex tooth grooves 4 by grinding. On the other hand, the cup-shaped grindstone 18 in the second embodiment includes first and second grinding faces 21a and 21b at the radially inner and outer locations, respectively, to form the concave tooth grooves 4 by grinding. Cooling-liquid ejecting bores 21d for ejecting a cooling liquid open in the radially inner first grinding face 21a at a radially inner location.

Figure 11:
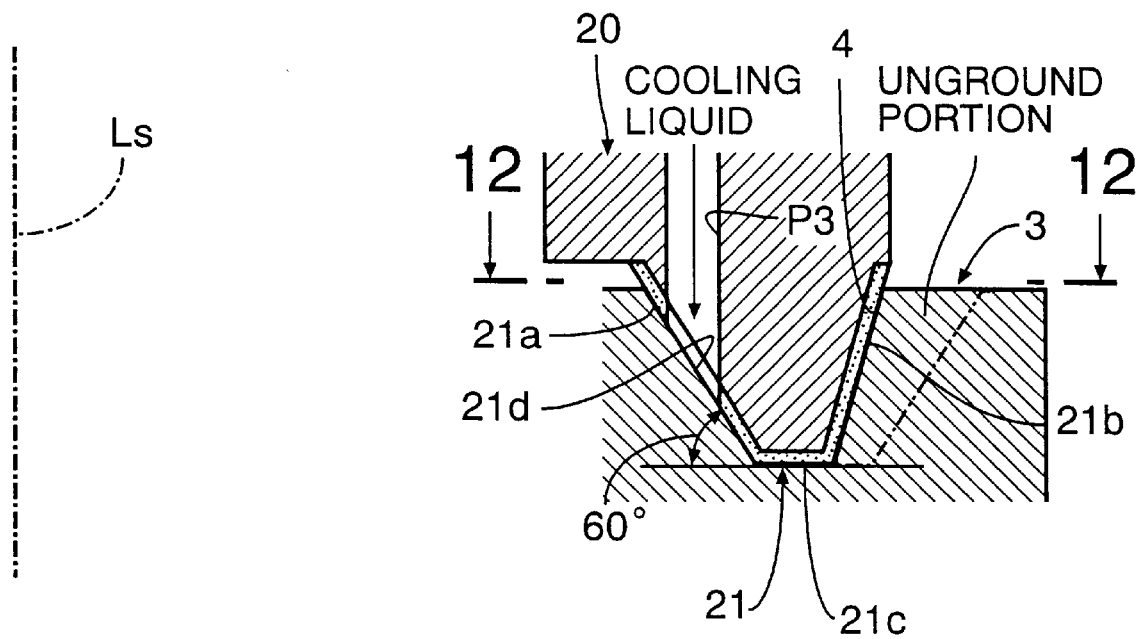
FIG. 11 is an enlarged sectional view according to a second embodiment of the present invention.
Figure 12:
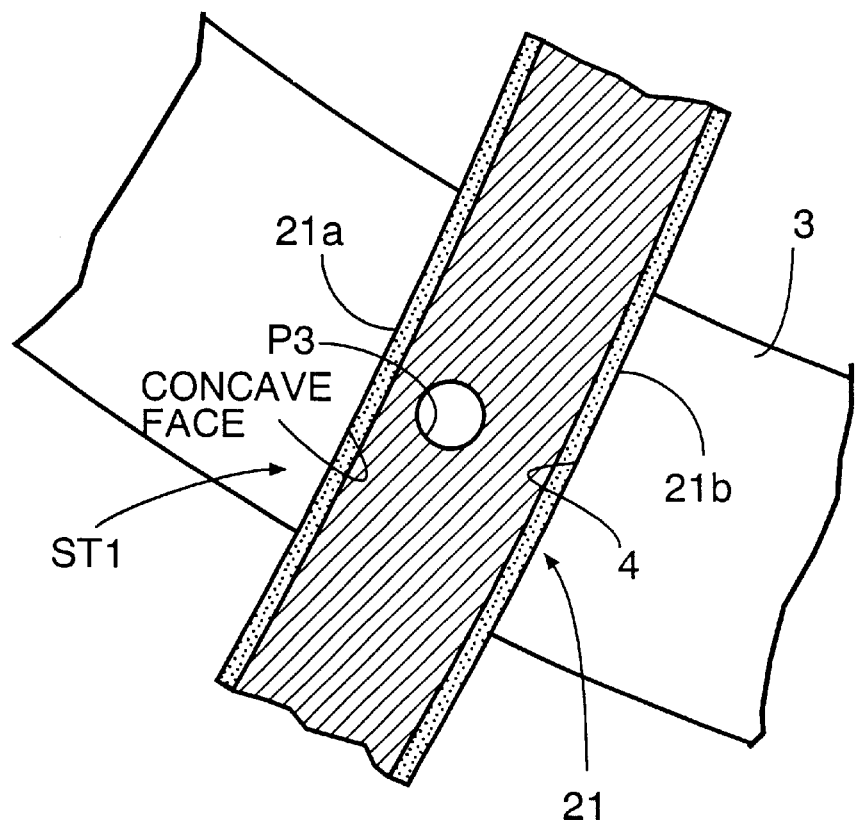
FIG. 12 is a sectional view taken along a line 12—12 in FIG. 11.
Figure 13:
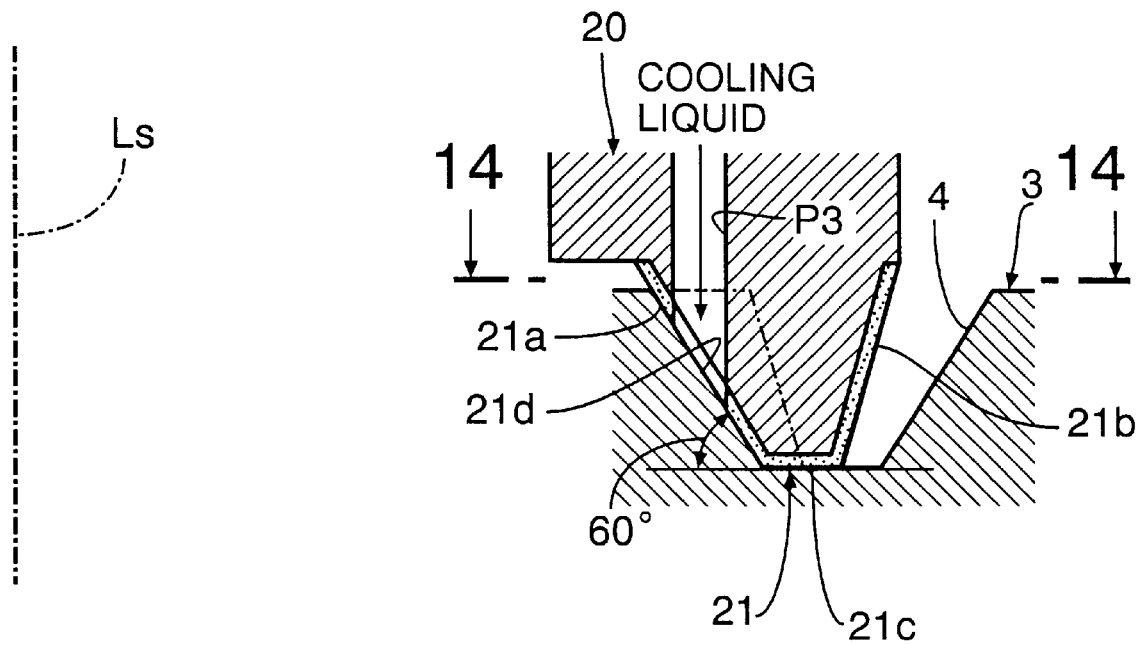
FIG. 13 is an enlarged sectional view according to the second embodiment of the present invention and similar to FIG. 9.
Figure 14:
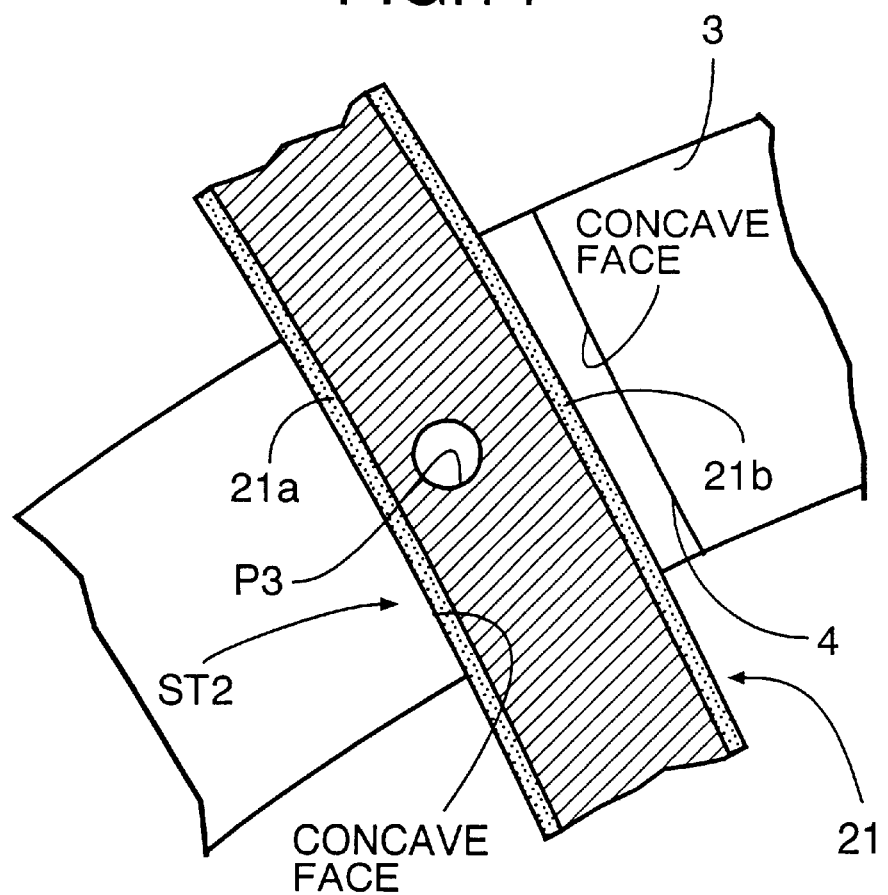
FIG. 14 is a sectional view taken along a line 14—14 in FIG. 13.

Halves of the concave tooth grooves 4 are finished by the first grinding face 21a in a primary processing step as shown in FIG. 11. Then, an unground portion, as shown by the dashed line in FIG. 11, left in the primary processing step is ground by the first grinding face 21a in a secondary processing step as shown in FIG. 13. In this manner, the entire convex tooth grooves 4 are finished. Even in this embodiment, two steps are carried out in each of the primary and secondary processing stages: a rough-finish processing step at which the cup-shaped grindstone 18 is fed stepwise in a three-stage manner, and a finish processing step at which the cup-shaped grindstone 18 is fed to a target finishing face and retained for a predetermined time. Therefore, it is possible to prevent the overheating and the clogging of the first, second and third grinding faces 21a, 21b and 21c to provide an enhancement in durability of the cup-shaped grindstone 18 and finishing accuracy. In addition, the cooling liquid is supplied from the cooling-liquid ejecting bores 21d provided in the radially inner first grinding face 21a. Hence, it is possible not only to effectively prevent the overheating and clogging of the first grinding face 21a, but also to feed the cooling liquid to the second and third grinding faces 21b and 21c by a centrifugal force to effectively prevent the overheating and clogging of the second and third grinding faces 21b and 21c.

While there has been illustrated and described what is at present preferred embodiments of the present invention, it will be understood by those skilled in the art that various modifications may be made, and equivalents may be substituted for elements and steps thereof without departing from the scope of the present invention.

For example, the cup-shaped grindstone 18 having CBN electrodeposited thereon has been illustrated in each of the embodiments, but diamond may be electrodeposited on the cup-shaped grindstone 18 in place of CBN, or a grindstone having abrasive grains deposited thereon by a process other than the electrodepositing process may be used.

In addition, the compressor wheel has been illustrated as the work W in each of the embodiments, but the present invention is applicable to any other work, and the tooth grooves 4 are not limited to the Curvic Coupling™, and other tooth grooves may be provided.

The number of the tooth grooves 4 made in the annular portion 3 of the work W is illustrated as being 24, but it is within the scope of the invention to form any suitable number as needed.

Further, the position of opening of the cooling-liquid ejecting bores 21d may be adjusted as necessary.

Therefore, it is intended that this invention not be limited to the particular embodiments disclosed herein, but will include all embodiments within the scope of the disclosure.

What is claimed is:

1. A method of forming tooth grooves which includes supporting a work having an annular portion with a work axis aligned with an indexing board axis of an indexing board and simultaneously forming radially extending tooth grooves at two points of an end face of the annular portion by grinding using a cup-shaped grindstone having an axis offset from the work axis while indexing the annular portion through a predetermined angle in a stepwise manner using the indexing board, the method comprising:

a rough-finish processing step wherein the tooth grooves are cut by feeding the cup-shaped grindstone a predetermined amount in a stepwise manner; and a finish processing step wherein the cut tooth grooves are finished by retaining the cup-shaped grindstone at a predetermined position after the rough-finish processing step, wherein a cooling liquid is supplied from cooling-liquid ejecting bores formed in at least one of a plurality of grinding faces formed in the cup-shaped grindstone during each of the rough-finish and finish processing steps.

2. The method according to claim 1, further comprising the step of electrodepositing abrasive grains on the plurality of grinding faces of the cup-shaped grindstone before the rough-finish processing step.

3. The method according to claim 1, wherein the formed tooth grooves are convex in shape and tooth ridges formed between the tooth grooves are concave in shape or the formed tooth grooves are concave in shape and tooth ridges formed between the tooth grooves are convex.

4. The method according to claim 3, further comprising the steps of:

positioning a grinding portion of the cup-shaped grindstone opposite the annular portion of the work at first and second processing stations, wherein the first and second-processing stations are located approximately 120° apart from each other relative to a radial outer face of the annular portion;

lowering the cup-shaped grindstone while rotating such about the axis of the cup-shaped grindstone; and simultaneously grinding two points of the annular portion separated from each other by 120° and corresponding to locations of the first and second processing stations.

5. The method according to claim 1, wherein a feed depth during each step is within a range of 0.01 mm to 0.10 mm.

6. The method according to claim 4, wherein the first processing station performs primary processing by grinding half of each of the tooth grooves formed therein.

7. The method according to claim 6, wherein the rough-finish and finish processing steps perform secondary processing at the second processing station to grind unground portions of each tooth groove.

* * * * *